(12) United States Patent
Naito (10) Patent No.: US 8,993,403 B2
(45) Date of Patent: Mar. 31, 2015

(54) SOCKET, AND CAPACITOR ELEMENT PRODUCING JIG USING SOCKET

(75) Inventor: Kazumi Naito, Tokyo (JP)

(73) Assignee: Showa Denko K.K., Tokyo (JP)

( * ) Notice: Subject to any disclaimer, the term of this patent is extended or adjusted under 35 U.S.C. 154(b) by 494 days.

(21) Appl. No.: 13/515,964

(22) PCT Filed: Dec. 13, 2010

(86) PCT No.: PCT/JP2010/072325
§ 371 (c)(1),
(2), (4) Date: Aug. 16, 2012

(87) PCT Pub. No.: WO2011/074512
PCT Pub. Date: Jun. 23, 2011

(65) Prior Publication Data
US 2012/0311833 A1    Dec. 13, 2012

(30) Foreign Application Priority Data

Dec. 15, 2009  (JP) ................................. 2009-284033

(51) Int. Cl.
| | |
|---|---|
| H01L 21/20 | (2006.01) |
| H01L 21/8222 | (2006.01) |
| H01L 21/8242 | (2006.01) |
| H01G 13/00 | (2013.01) |

(52) U.S. Cl.
CPC ..................... *H01G 13/00* (2013.01)
USPC .... 438/381; 438/239; 438/329; 257/E21.008; 257/E21.09; 257/E21.011

(58) Field of Classification Search
USPC .......................... 438/239, 329, 381; 29/25.03; 257/E21.008, E21.09, E21.011
See application file for complete search history.

(56) References Cited

U.S. PATENT DOCUMENTS

| | | | |
|---|---|---|---|
| 2004/0145877 A1* | 7/2004 | Fujiyama et al. | 361/763 |
| 2007/0101565 A1 | 5/2007 | Naito et al. | |
| 2008/0148541 A1* | 6/2008 | Nishimura et al. | 29/25.03 |
| 2010/0079927 A1* | 4/2010 | Shimizu et al. | 361/519 |

FOREIGN PATENT DOCUMENTS

| | | |
|---|---|---|
| JP | 02-276220 A | 11/1990 |
| JP | 05-020318 U | 3/1993 |
| JP | 2005-244154 A | 9/2005 |

OTHER PUBLICATIONS

Official Communication issued in International Patent Application No. PCT/JP2010/072325, mailed Apr. 5, 2012.
Official Communication issued in International Patent Application No. PCT/JP2010/072325, mailed on Mar. 8, 2011.

* cited by examiner

*Primary Examiner* — Mohsen Ahmadi
(74) *Attorney, Agent, or Firm* — Keating & Bennett, LLP (57) ABSTRACT

The present invention provides a socket by which a capacitor element can be produced without causing contamination of chemical conversion treatment liquid or semiconductor layer forming liquid even if the chemical conversion treatment liquid or the semiconductor layer forming liquid has a corrosive property, and a lead wire of a positive electrode can be stably retained even if diameters of the lead wires are difference. The socket (1) of the present invention is provided with a conductive socket body portion (2) having an insertion port, a resin insulation portion (5) covering a part of the socket body portion (2) so as not to close an insertion port (37), and a resin coating portion (3) coating at least the insertion portion (37) of the socket body portion (2).

11 Claims, 8 Drawing Sheets

SOCKET, AND CAPACITOR ELEMENT PRODUCING JIG USING SOCKET

TECHNICAL FIELD

The present invention relates to, for example, a socket which can be preferably used as a capacitor element producing jig to produce a capacitor element for use in, for example, a solid electrolytic capacitor.

In this disclosure, the language "resin" is used to include the meaning of not only resin, but also rubber.

BACKGROUND TECHNIQUE

A capacitor for a CPU (Central Processing Unit) for use in a personal computer or the like is required to be high in capacity and low in ESR (Equivalent Series Resistance) in order to control fluctuation in voltage and reduce heat generation at the time of passing high ripple currents. As such a capacitor, for example, an aluminum solid electrolytic capacitor and a tantalum solid electrolytic capacitor are used. Such a solid electrolytic capacitor is known to have a structure including one electrode (electric conductor) of an aluminum foil having a surface layer with minute pores or a sintered compact obtained by sintering tantalum powder having minute pores inside thereof, a dielectric layer formed on a surface of the electrode, and another electrode (normally, semiconductor layer) formed on the dielectric layer.

In a solid electrolytic capacitor, a method is known in which a dielectric layer is formed on a surface of a conductive member by electrically connecting one end of a lead wire extended from a conductive member to a metallic connection terminal of a socket attached to a lower end portion of a circuit board having an electric circuit, immersing the conductive member in chemical conversion treatment liquid, and passing a current between the conductive member as a positive electrode and a cathode (negative) electrode arranged in the chemical conversion treatment liquid, and then a semiconductor layer is formed on a surface of the dielectric layer on the surface of the conductive member by immersing the conductive member having the dielectric layer formed on a surface thereof in semiconductor layer forming liquid, and passing a constant current by applying a voltage between the conductive member as a positive electrode and a cathode (negative) electrode arranged in the semiconductor forming liquid (see Patent document 1).

PRIOR ART

Patent Document

Patent Document 1: Japanese Unexamined Laid-open Patent Application Publication No. 2005-244154 (JP-2005-244154, A).

SUMMARY OF THE INVENTION

Problems to be Solved by the Invention

In cases where processing liquid containing acid, such as, e.g., phosphoric acid, is used as the aforementioned chemical conversion treatment liquid, however, the metallic connection terminal exposed at the bottom surface side of the socket is exposed to mist or the like of the chemical conversion treatment liquid containing acid, such as, e.g., phosphoric acid, causing partial corrosion of the terminal to be dropped and mixed in the chemical conversion treatment liquid, which in turn causes contamination of the chemical conversion treatment liquid. Such contamination of the chemical conversion treatment liquid causes difficulty in forming a good dielectric layer, which prevents production of a capacitor having a sufficient moisture resistance.

Further, in cases where a liquid containing acid is used as the aforementioned semiconductor layer forming liquid, in the same manner as mentioned above, the metallic connection terminal exposed at the bottom surface side of the socket is exposed to mist or the like of the semiconductor layer forming liquid containing acid, causing partial corrosion of the terminal to be dropped and mixed in the semiconductor layer forming liquid, which in turn causes contamination of the semiconductor layer forming liquid. Such contamination of the semiconductor layer forming liquid causes difficulty in forming a good semiconductor layer, which prevents production of a good semiconductor layer.

With respect to the wire diameter of the lead wire of the conductive member, there are many different diameters depending on the size or the like of the conductor member. However, the wire diameter of the lead wire of the conductive member capable of inserting into a specific socket and connecting thereto is limited to a specific range. A lead wire having a wire diameter larger than the specific range cannot be inserted into a socket, while a lead wire having a wire diameter smaller than the specific range can be electrically connected at the deep inner side of the socket but cannot attain sufficient electric connection to the socket due to the smaller diameter. In the latter case, the lead wire is not sufficiently held by the socket, which readily causes dropping from the socket. In cases where anode members are different in size, the wire diameter range of the lead wire to be connected to a socket inevitably increases. In such cases, there existed a problem that a certain connection socket could not be used.

The present invention was made in view of the aforementioned technical background, and aims to provide a socket and a capacitor element producing jig capable of producing a capacitor element without causing contamination of chemical conversion treatment liquid or semiconductor layer forming liquid, i.e., even in cases where such liquid is corrosive, for example, when the chemical conversion treatment liquid contains acid or the semiconductor layer forming liquid contains acid, and also capable of stably holding a lead wire of an anode member even in cases where the lead wire is small in wire diameter.

Means for Solving the Problems

In order to attain the aforementioned objects, the present invention provides the following means.

[1] A socket comprising:
a conductive socket body portion having an insertion port;
a resin insulation portion covering a part of the socket body portion so as not to close the insertion port; and
a resin coating portion coating at least the insertion port of the socket body portion.

[2] The socket as recited in the aforementioned Item 1, wherein the coating portion coats an entire outer surface of the socket body portion.

[3] The socket as recited in the aforementioned Item 1 or 2, wherein resin constituting the coating portion is at least one resin selected from the group consisting of natural rubber, synthetic rubber, silicone resin, thermoplastic elastomer, and urea resin.

[4] The socket as recited in the aforementioned Item 1 or 2, wherein resin constituting the coating portion is silicone resin.

[5] The socket as recited in any one of the aforementioned Items 1 to 4, wherein resin constituting the coating portion is transparent.

[6] The socket as recited in any one of the aforementioned Items 1 to 5, further comprising a conductive lead wire portion electrically connected to the socket body portion.

[7] A capacitor element producing jig comprising:

a circuit board having an electric circuit for limiting an electric current; and the socket as recited in any one of the aforementioned Items 1 to 6, the socket being attached to the circuit board, wherein the socket body portion is electrically connected to the electric circuit.

[8] The capacitor element producing jig as recited in the aforementioned Item 7, wherein the electric circuit for limiting the electric current is a constant current circuit.

[9] The capacitor element producing jig as recited in the aforementioned Item 7 or 8, wherein the electric circuit is also a voltage limiting circuit.

[10] The capacitor element producing jig as recited in any one of the aforementioned Items 7 to 9, wherein the socket is attached to an end portion of the circuit board.

[11] A production method of a capacitor element, comprising a dielectric layer forming step including: connecting a conductive member to the socket for a capacitor element producing jig as recited in any one of the aforementioned Items 7 to 10;

immersing the conductive member in chemical conversion liquid; and in the immersed state, passing a current between the conductive member as a positive electrode and an electrode arranged in the chemical conversion processing liquid as a cathode (negative) electrode to thereby form a dielectric layer on a surface of the conductive member.

[12] A production method of a capacitor element, comprising a semiconductor layer forming step including:

connecting a conductive member having a dielectric layer on a surface thereof to the socket for the capacitor element producing jig as recited in any one of the aforementioned Items 7 to 10;

immersing the conductive member in semiconductor layer forming liquid; and in the immersed state, passing a current between the conductive member as an anode (positive) electrode and an electrode arranged in the semiconductor layer forming liquid as a cathode (negative) electrode to thereby form a semiconductor layer on a surface of the dielectric layer.

[13] A production method of a capacitor element, comprising:

a dielectric layer forming step including:

connecting a conductive member to the socket for the capacitor element producing jig as recited in any one of the aforementioned Items 7 to 10;

immersing the conductive member in chemical conversion treatment liquid; and in the immersed state, passing a current between the conductive member as an anode (positive) electrode and an electrode arranged in the chemical conversion treatment liquid as a cathode (negative) electrode to thereby form a dielectric layer on a surface of the conductive member, and a semiconductor layer forming step including:

immersing the conductive member having the dielectric layer on the surface thereof obtained by the dielectric layer forming step in semiconductor layer forming liquid; and in the immersed state, passing a current between the conductive member as an anode (positive) electrode and an electrode arranged in the semiconductor layer forming liquid as a cathode (negative) electrode to thereby form a semiconductor layer on a surface of the dielectric layer.

[14] A production method of a capacitor, comprising the steps of:

electrically connecting electric connection terminals to the conductive body member and the semiconductor layer of a capacitor element obtained by the production method as recited in any one of the aforementioned Items 11 to 13; and sealing the capacitor element except for a part of the electric connection terminals.

Effects of the Invention

According to the present invention as recited in the aforementioned Item [1], at least the insertion portion of the conductive socket body portion is coated (protected) by the resin coating portion. Therefore, even in cases where the chemical conversion treatment liquid contains acid or the semiconductor layer forming liquid contains acid, at least the insertion port is not exposed to mist (mist containing acid) or the like of the chemical conversion treatment liquid or the semiconductor layer forming liquid, preventing occurrence of corrosion of the insertion port and the like. Even if the socket body portion is corroded, the corroded material is prevented from being dropped, which enables production of a capacitor element without causing contamination of the chemical conversion treatment liquid or the semiconductor layer forming liquid. Furthermore, due to the existence of the coating portion coating the insertion port of the socket body portion, the lead wire of the conductive member (anode member) can be firmly held. Thus, a single socket can cope with various lead wire diameters (example, 0.05 to 1 mm), and therefore even if the lead diameter of the lead wire is small, the connection state of the conductive member (anode member) to the socket can be stabilized.

According to the invention as recited in the aforementioned Item [2], the coating portion coats the entire outer surface of the socket body portion. Therefore, even in cases where the chemical conversion treatment liquid contains acid or the semiconductor layer forming liquid contains acid, the entire socket body portion is not exposed to mist (mist containing acid) or the like of the chemical conversion treatment liquid or the semiconductor layer forming liquid, preventing occurrence of corrosion of the socket body portion. Even if the socket body portion is corroded, the corroded material is prevented from being dropped, which enables production of a capacitor element without causing contamination of the chemical conversion treatment liquid or the semiconductor layer forming liquid. Furthermore, due to the existence of the coating portion coating the insertion port of the socket body portion, the lead wire of the conductive member (anode member) can be firmly held. Thus, a single socket can cope with various lead wire diameters (example, 0.05 to 1 mm), and therefore even if the lead diameter of the lead wire is small, the connection state of the conductive member (anode member) to the socket can be stabilized.

According to the invention as recited in the aforementioned Item [3], it is constituted such that the coating portion contains at least one resin selected from the group consisting of natural rubber, synthetic rubber, silicone resin, thermoplastic elastomer, and urea resin. This facilitates insertion of the lead wire of the conductive member (anode member) into the insertion port via the coating portion (the operation of running the lead wire of the anode member through the coating portion to be inserted into the insertion port can be performed easily).

According to the invention as recited in the aforementioned Item [4], it is constituted such that the coating portion contains silicone resin. This facilitates insertion of the lead wire of the conductive member (anode member) into the insertion port via the coating portion (the operation of running the lead wire of the anode member through the coating portion to be inserted into the insertion port can be performed easily).

According to the invention as recited in the aforementioned Item [5], since the coating portion is transparent, whether or not the insertion port is corroded can be confirmed.

According to the invention as recited in the aforementioned Item [6], since the lead wire portion can be connected to the electric circuit which will be mentioned later via the socket or the like, the connection to the electric circuit or changing of the connection to another electric circuit can be performed easily.

According to the invention as recited in the aforementioned Items [7], [8], and [9], even in cases where the chemical conversion treatment liquid contains acid or the semiconductor layer forming liquid contains acid, a capacitor element producing jig capable of producing a capacitor element without causing contamination of the chemical conversion treatment liquid or the semiconductor layer forming liquid can be provided. Accordingly, using the capacitor element producing jig according to the present invention, a capacitor element having a moisture resistance can be produced.

According to the invention as recited in the aforementioned Item [10], since the socket is attached to an end portion of the circuit board, the operation of connecting the conductive member (anode member) to the socket can be facilitated.

According to the invention as recited in the aforementioned Items [11], [12], and [13], no contamination of the chemical conversion treatment liquid or the semiconductor layer forming liquid occurs in producing a capacitor element, and therefore a high quality capacitor element having sufficient moisture resistance can be produced.

According to the invention as recited in the aforementioned Item [14], a high quality capacitor having sufficient moisture resistance can be produced.

BRIEF EXPLANATION OF THE DRAWINGS

FIG. 1 is a view showing one embodiment of a capacitor element producing jig according to the present invention, wherein FIG. 1(A) is a front view and FIG. 2(B) is a rear view.

FIG. 3 is an enlarged view of the parallel connected socket according to the present invention, wherein FIG. 3(A) is a front view, FIG. 3(B) is a bottom view, and FIG. 3(C) is a cross-sectional view taken along the line X-X in FIG. 3(A).

FIG. 4 is an enlarged view of the connected socket group before coating with resin (before coating with the coating portion), wherein FIG. 4(A) is a front view, FIG. 4(B) is a bottom view, and FIG. 4(C) is a cross-sectional view taken along the line Y-Y in FIG. 4(A).

EMBODIMENTS FOR CARRYING OUT THE INVENTION

Figure 3:
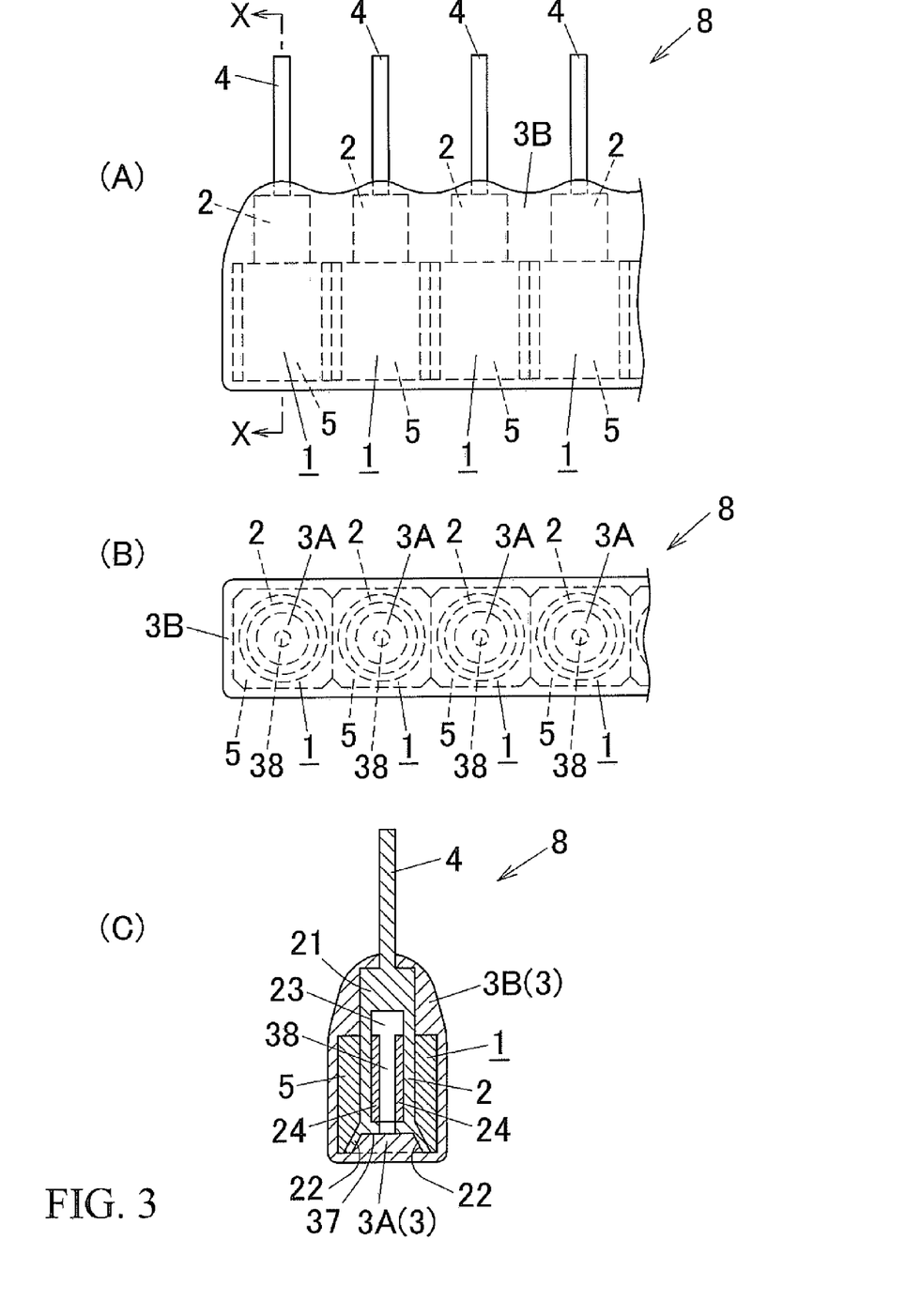

One embodiment of a socket 1 according to the present invention is shown in FIG. 3. This socket 1 is provided with a conductive socket body portion 2, a conductive lead wire portion 4, a resin insulation portion 5, and a resin coating portion 3. In this embodiment, a plurality of sockets 1 are connected in parallel to constitute a parallel connected socket 8. In detail, a plurality of sockets 1 are arranged in parallel and facing (adjacent) side surfaces of the adjacent sockets 1 are connected to thereby constitute a parallel connected socket 8.

The socket body portion 2 is a portion which plays the role of an electric connecting terminal for electrically connecting to an electric conductive member (anode member) 52 and is made of a conductive material, such as, e.g., a metal material, to attain electric continuity. Although the metal constituting the socket body portion 2 is not specifically limited, it is preferably to use metal (including alloy) containing at least one kind of metal selected from the group consisting of copper, iron, silver, and aluminum as a main composition (containing 50 mass % or more). The surface of the socket body portion 2 can be coated with at least one conventionally known plated layer, such as, e.g., a tin plated layer, a solder plated layer, a nickel plated layer, a gold plated layer, a silver plated layer, or a copper plated layer.

Figure 4:
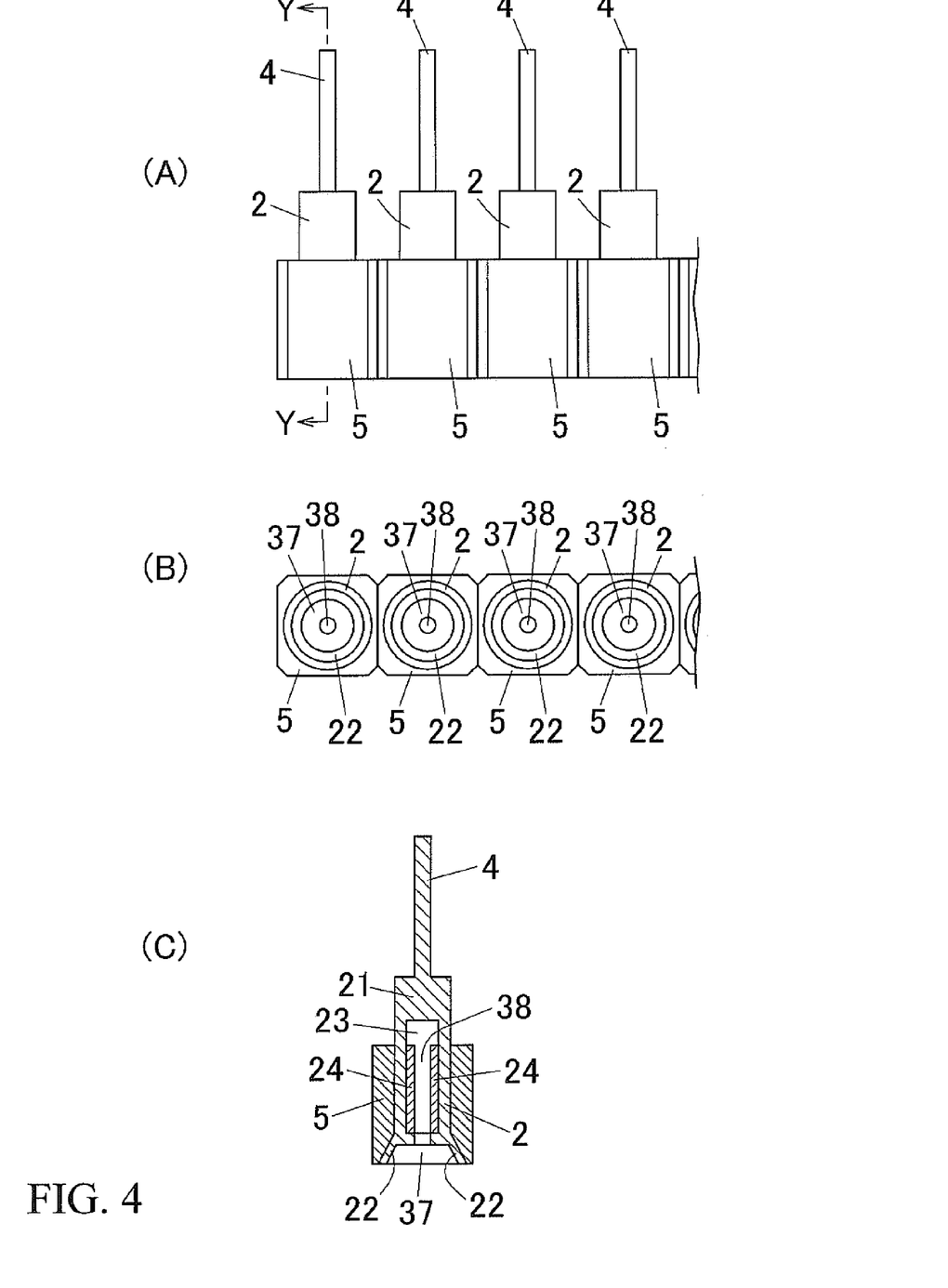

In this embodiment, the socket body portion 2 includes a columnar portion 21 and a flared portion 22 extending outward downwardly from the peripheral edge portion of the bottom surface of the columnar portion 21 (see FIGS. 3 and 4). The columnar portion 21 and the flared portion 22 are made of conductive material, such as, e.g., metallic material. A lead wire insertion port 37 is formed by being surrounded by the flared portion 22 (see FIGS. 3 and 4). The columnar portion 21 is provided with a hollow portion 23 formed in an inner portion of the columnar portion 21, the hollow portion 23 having an opening at the bottom surface of the columnar portion 2. The hollow portion 23 is in communication with a space of the lead wire insertion port 37. A metallic spring member 24 is arranged on the inner peripheral surface of the hollow portion 23, and a lead wire insertion hole 38 is formed by being surrounded by the spring member 24. The lead wire insertion hole 38 is in communication with the space of the lead wire insertion port 37. When a lead wire 53 or the like of a conductive member (anode member) 52 is inserted into the lead wire insertion hole 38 in a contact manner, the socket body portion 2 and the conductive member (anode member) 52 are electrically connected.

A lead wire portion 4 is extended from the central portion of the upper surface (upper surface of the columnar body 21) of the socket body portion 2 (see FIGS. 3 and 4). The lead wire portion 4 is made of conductive material, such as, e.g., metallic member. The lead wire portion 4 is integrally formed with and electrically connected to the socket body portion 2. As the metal constituting the lead wire portion 4, the same material as the material constituting the socket body portion 2 can be exemplified. The lead wire portion 4 is normally constituted by the same metal as the metal constituting the socket body portion 2.

A part of the socket body portion 2 is coated with the resin insulation portion 5 in a manner such that the lead wire insertion port 37 is not covered by the resin insulation portion 5. In this embodiment, the peripheral side surface of the socket body portion 2 is partially coated with the resin insulation portion 5 (see FIGS. 3 and 4).

The lead wire insertion port 37 of the socket body portion 2 is closed by resin filled therein. In other words, the lead wire insertion port 37 is filled by and coated with a resin filled coating portion 3A. Further, in this embodiment, the insulation portion 5 surrounding the peripheral side surface of the socket body portion 2 is also coated with a resin periphery coating portion 3B. In this embodiment, the outer surface of the socket body portion 2 is entirely coated with the coating portion 3 (the filled coating portion 3A and the periphery coating portion 3B) (see FIG. 3).

Although the resin constituting the insulation portion 5 is not specifically limited, hard resin, such as, e.g., epoxy resin, phenol resin, imide resin, carbonate resin, amide resin, amide-imide resin, ester resin, and phenylene sulfide resin, can be exemplified.

As the resin constituting the coating portion 3 (3A and 3B), resin having rubber elasticity is normally used. Among other things, it is preferable to use at least one kind of resin selected from the group consisting of natural rubber, synthetic rubber, silicone resin, thermoplastic elastomer, and urea resin on the point that the lead wire 53 of the conductive member (anode member) 52 can be easily inserted into the insertion port 37 via the resin filled coating portion 3A (i.e., the lead wire 53 of the anode member 52 can be easily inserted into the lead wire insertion hole 38 via the insertion portion 37 by penetrating the resin filled coating portion 3A). Among them, it is especially preferable to use silicone resin.

As the natural rubber, although it is not specifically limited, for example, isoprene rubber can be exemplified. As the synthetic rubber, although it is not specifically limited, for example, butadiene rubber, chloroprene rubber, and acrylonitrile rubber can be exemplified. As the silicone resin, although it is not specifically limited, for example, unmodified silicone resin, and epoxy modified silicone resin can be exemplified. As the thermoplastic elastomer, although it is not specifically limited, for example, styrene-butadiene block copolymer elastomer, olefin series elastomer, urethane series elastomer, polyester series elastomer, nitrile series elastomer, polyamide series elastomer, fluorine series elastomer, chlorinated polyethylene elastomer, chlorinated ethylene copolymer series elastomer, and ester halogen series elastomer can be exemplified.

As the resin constituting the coating portion 3 (3A and 3B), it is preferable to use transparent resin. In this case, there is an advantage that it can be easily performed to confirm presence or absence and the degree of corrosion of the lead wire insertion port 37 of the socket body portion 2 or the like.

Figure 1:
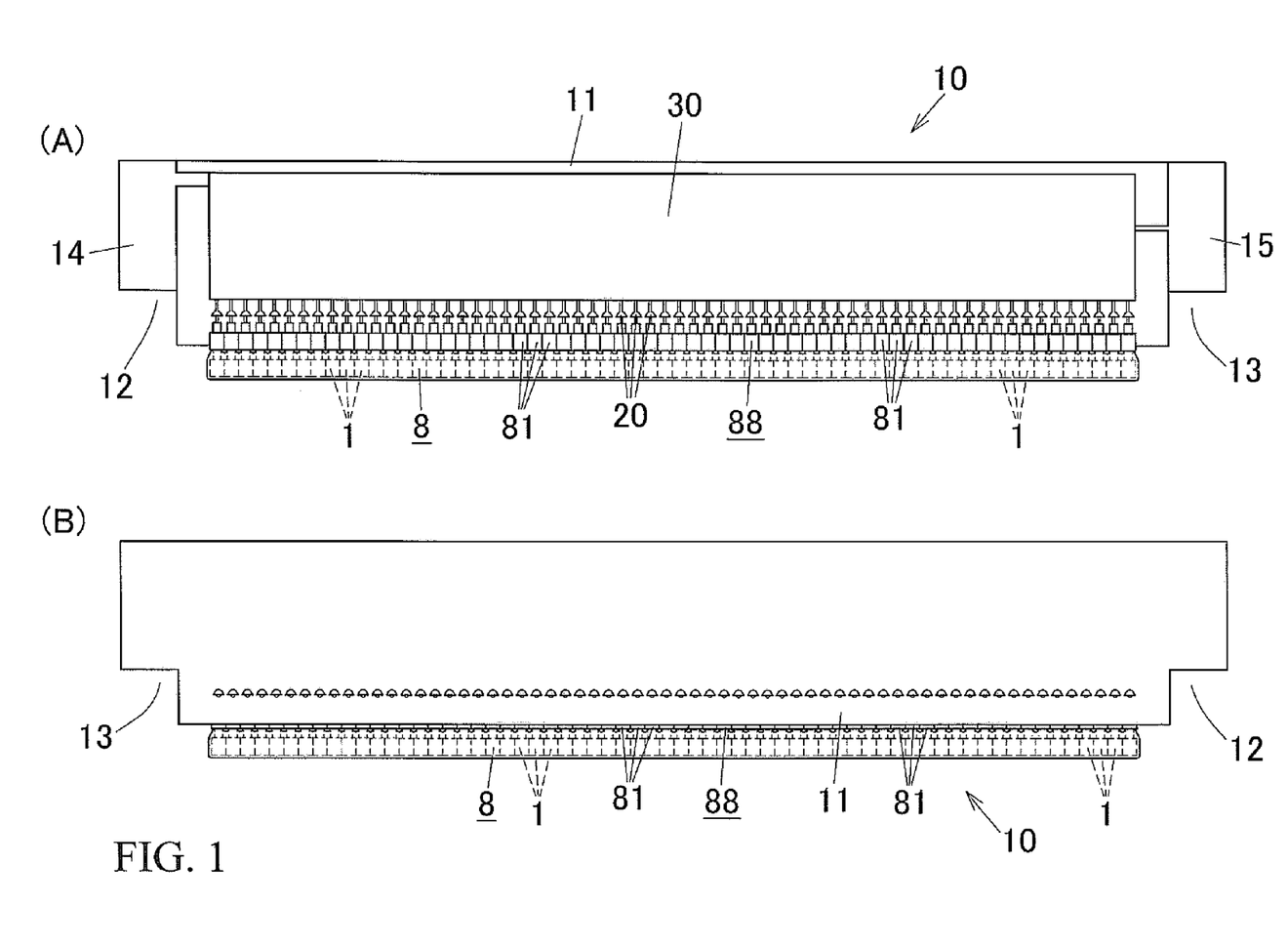
Figure 2:
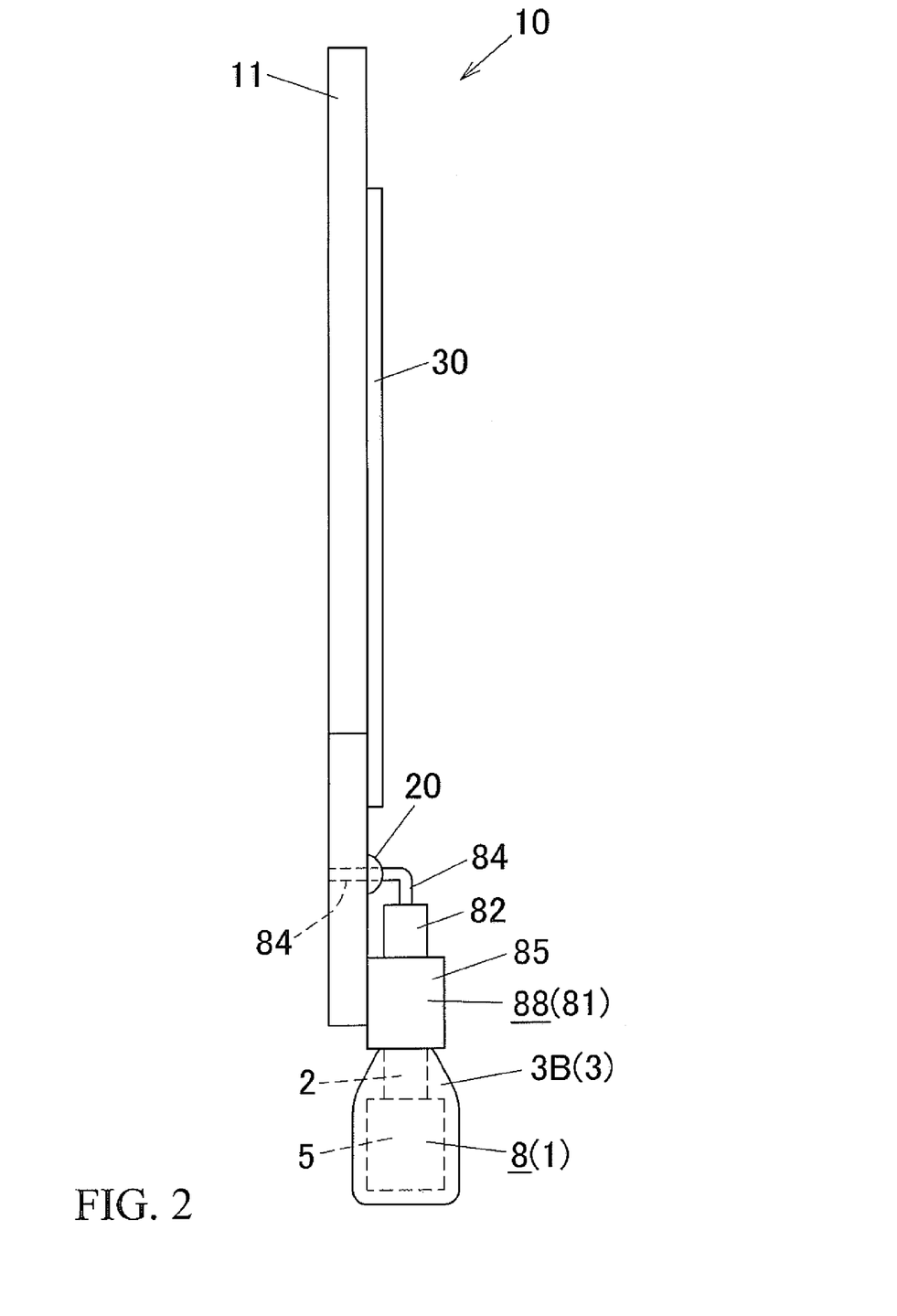
FIG. 2 is a left side view of the capacitor element producing jig shown in FIG. 1.

Next, one embodiment of a capacitor element producing jig 10 according to the present invention is shown in FIGS. 1 and 2. The capacitor element producing jig 10 is constituted by the socket 1 (parallel connected socket 8). The capacitor element producing jig 10 is provided with a circuit board 11 and a plurality of sockets 1.

As the circuit board 11, an insulation board is used. Although the material of the insulation board is not specifically limited, for example, glass epoxy resin, imide resin, and ceramics can be exemplified.

On the surface of the circuit board 11, as shown in FIG. 1, an electric circuit 30 having a pair of electric connection terminals 14 and 15 is formed. This electric circuit 30 includes a current limiting circuit (e.g., a circuit shown in FIGS. 7 and 8) configured to independently supply electricity to every conductive member (anode member) 52 via the socket 8 of the present invention and the lead wire 53 connected to the socket 8.

Accordingly, the maximum value of the current flowing each conductive member (anode member) 52 becomes the current limiting value of the circuit. The current limiting circuit is preferably a constant current circuit (e.g., the circuit shown in FIG. 7) for the purpose of minimizing the deviation of capacitors to be obtained. It is more preferable that the electric circuit 30 is a circuit configured to limit a voltage to be applied to each conductive member (anode member) 52. In this case, even if a relatively large current flows, the maximum value of the voltage applied to the conductive member 52 is limited, resulting in a reduced processing time for chemical conversion and/or semiconductor layer formation.

The pair of electric terminals 14 and 15 are provided such that one of the electric terminals 14 is provided at one longitudinal end portion of the circuit board 11 and the other of the terminals 15 is provided at the other longitudinal end portion. One of the electric terminals is an electric current limiting terminal 14, and a current limit value is set by a voltage applied to this terminal 14. For example, in the case of the circuit shown in FIG. 7, the current limit value can be set by the potential difference between the current limiting terminal 14 and a voltage limiting terminal 15 which will be explained later. While in the case of the circuit shown in FIG. 8, the current limit value can be set by the potential difference between the current limiting terminal 14 and the cathode (negative) plate 51.

The other electric terminal is a voltage limiting terminal 15, and a maximum value of a voltage to be applied to each conductive member (anode member) 52 is limited by a voltage applied to this terminal 15. For example, in the case of circuits shown in FIGS. 7 and 8, the maximum voltage value can be set by the potential difference between the voltage limiting terminal 15 and the cathode (negative) plate 51.

The socket 1 is attached to the lower end portion of the circuit board 11. In detail, as shown in FIGS. 1 and 2, a parallel connected socket 88 (having the same structure as the parallel connected sockets 8 of the present invention except that no coating portion is provided) are secured to the lower end portion of the circuit board 11. A lead wire portion 84 extended upward from each socket 81 is bent such that the lead wire curves at an angle of about 90-degrees, and the tip end portion of the lead wire portion 84 is inserted into the through-hole formed in the lower portion of the circuit board 11 and connected to the circuit board 11 with solder 20 (see FIG. 2). The lead wire portion 4 of each socket 1 of the parallel connected socket 8 of the present invention is inserted into and connected to the insertion port formed in the bottom surface of each socket 81 attached to the circuit board 11, so that the parallel connected socket 8 is attached to the lower end portion of the circuit board 11 (see FIGS. 1, 2 and 6). The parallel connected socket 8 (a plurality of sockets 1) is attached to the circuit board 11 as mentioned above, so that a capacitor element producing jig 10 of the present invention is constituted. In the first stage parallel connected socket (no coating portion 3) 88 shown in FIG. 2, "82" denotes a socket body portion, and "85" denotes an insulation portion.

It can be configured such that the lead wire portion 4 of each socket 1 of the parallel connected socket 8 of the present invention is directly inserted into the through-hole formed at the lower portion of the circuit board 11 without using the parallel connected socket 88 and connected to the circuit board 11 with solder 20, so that the parallel connected socket 8 is directly attached to the lower end portion of the circuit board 11.

Figure 7:
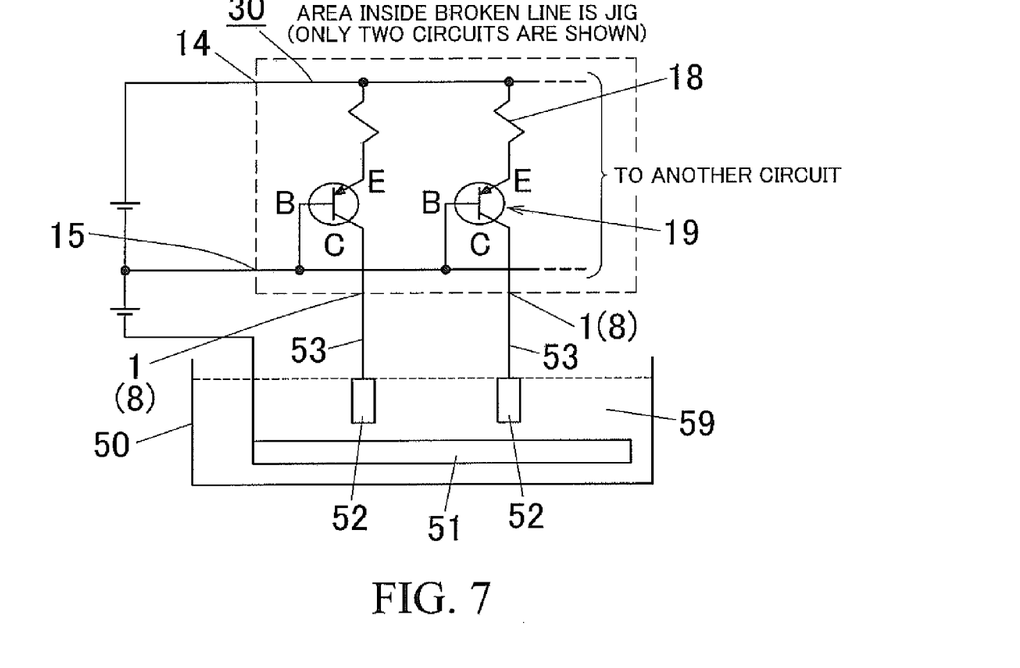
FIG. 7 is a schematic electric circuit view of a production method of a capacitor element producing jig according to the present invention (only two circuits for a capacitor element producing jig are shown).
Figure 8:
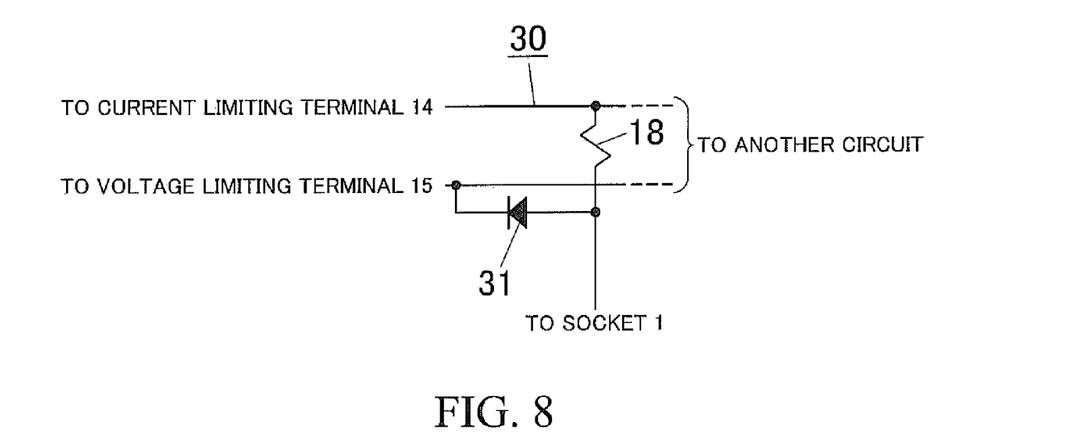
FIG. 8 is a circuit diagram showing another example of an electric connection circuit of the circuit board of the capacitor element producing jig.

In the present invention, the electric connection circuit for the circuit board 11 of the capacitor element producing jig 10 is not specifically limited to the structure shown in FIG. 7, and can be, for example, a circuit structure as shown in FIG. 8.

Figure 5:
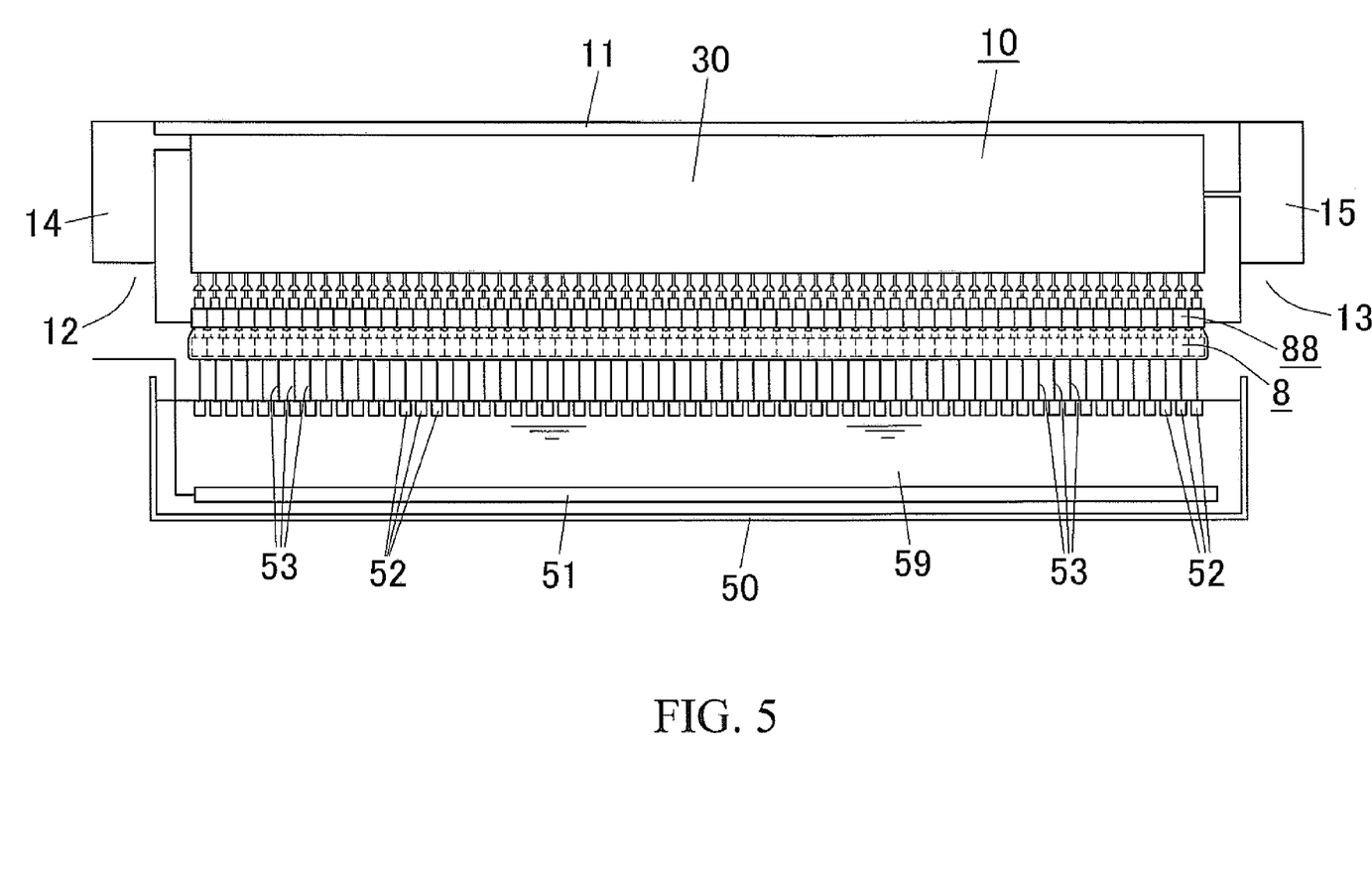
FIG. 5 is a schematic view showing a capacitor element producing method using the capacitor element producing jig according to the present invention.

Next, a method of producing a capacitor element using the aforementioned capacitor element producing jig 10 will be explained. One example of a production method of a capacitor element is schematically shown in FIG. 5. FIG. 7 is a schematic electrical circuit structural view of a production method of the capacitor element.

Initially, a processing container 50 filled with processing liquid 59 is prepared. As the processing liquid 59, for example, chemical conversion processing liquid for forming a dielectric layer 54 and semiconductor layer forming liquid for forming a semiconductor layer 55 can be exemplified.

A conductive member (anode member) 52 having a lead wire 53 is connected to the socket 1 of the capacitor element producing jig 10. In detail, the lead wire 53 of the anode member 52 is run through the resin filled coating portion 3A of the socket 1 of the capacitor element producing jig 10 to be inserted into the lead wire insertion hole 38 via the lead wire insertion port 37, so that the conductive member (anode member) 52 is electrically connected to the socket 1 (see FIG. 6). The tip end portion of the lead wire 53 is brought into contact with the metal spring member 24 arranged in the hollow portion 23 of the socket body portion 2, causing electrical connection between the socket 1 and the conductive member (anode member) 52.

Thereafter, the capacitor element producing jig 10 to which the conductive members 52 are set is arranged at a portion above the processing container 50, and then lowered so that at least a part (normally, the entire portion) of the conductive member (anode member) 52 is immersed in the processing liquid 59 and the jig 10 is fixed at the height position (see FIG. 5).

Figure 9:
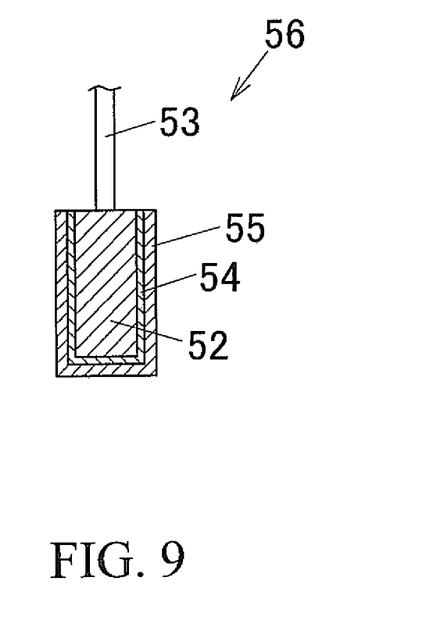
FIG. 9 is a partial cross-sectional view showing one embodiment of a capacitor element to be produced by the production method according to the present invention.

In this immersed state of the conductive members (anode members) 52, an electric current is passed between the conductive member 52 as an anode and the cathode (negative) plate 51 as a cathode arranged in the processing liquid 59 (see FIGS. 5 and 7). By using chemical conversion processing liquid as initial processing liquid 59, a dielectric layer 54 (see FIG. 9) can be formed on the surface of the conductive member 52 due to the passing of electric current (Dielectric Layer Forming Step).

Next, the chemical conversion treatment liquid 59 is removed from the processing container 50. If needed, the conductive members (anode members) 52 each provided with a dielectric layer 54 on the surface thereof is washed with water and dried. Thereafter, semiconductor layer forming processing liquid 59 is newly poured into the processing container 50, and in the same manner as mentioned above, the jig 10 is lowered so that at least a part (normally the entire part) of the conductive member (anode member) 52 is immersed into the semiconductor layer forming processing liquid 59. The jig 10 is fixed at the height position. In this fixed state, an electric current is passed between the conductive member 52 as an anode and the cathode (negative) plate 51 as a cathode arranged in the semiconductor layer forming processing liquid 59, or an electric current is passed using the semiconductor layer forming processing liquid 59 as second processing liquid. With this, a semiconductor layer 55 can be formed on the surface of the dielectric layer 54 on the surface of the conductive member 52 (semiconductor layer forming step). Thus, a capacitor element 56 in which a dielectric layer 54 is laminated on the surface of the conductive member 52 and a semiconductor layer 55 is further laminated on the surface of the dielectric layer 54 can be produced (see FIG. 9).

As the conductive member 52, although it is not specifically limited, for example, at least one kind of conductive member selected from the group consisting of valve action metal and conductive oxide of valve action metal can be exemplified. Concrete examples thereof include aluminum, tantalum, niobium, titanium, zirconium, niobium monoxide, and zirconium monoxide. Furthermore, the conductive member 52 can be a laminated member including a substrate and a conductive member laminated on the surface layer of the substrate. As an example of such laminated member in which a conductive member is laminated on the surface layer, a laminated member in which the conductive member is laminated on a substrate made of, e.g., paper, insulating polymer, or glass, can be exemplified.

As a shape of the conductive member 52, it is not specifically limited, and can be a foil-like shape, a plate-like shape, a bar-like shape, or a rectangular solid-like shape.

As the chemical conversion treatment liquid 59, it is not specifically limited, and can be, for example, liquid in which conventionally known electrolyte, such as, e.g., organic acid or salt thereof (for example, adipic acid, acetic acid, ammonium adipate, benzoic acid), or inorganic acid or salt thereof (for example, phosphoric acid, silicic acid, ammonium phosphate, ammonium silicate, sulfuric acid, ammonium sulfate), is dissolved or suspended. By performing the aforementioned passing of electric current using such chemical conversion treatment liquid, a dielectric layer 54 including insulating metallic oxide, such as, e.g., $Ta_2O_5$, $Al_2O_2$, $Zr_2O_2$, or $Nb_2O_5$, can be formed on the surface of the conductive member 52.

It can be configured such that, omitting a dielectric layer forming step using such chemical conversion treatment liquid, a conductive member 52 having a dielectric layer 54 previously formed on a surface thereof is subjected to the semiconductor layer forming step. As such a surface dielectric layer 54, a dielectric layer including at least one component selected from oxides having insulation properties as a main component, and a dielectric layer conventionally known in the field of ceramic capacitors or film capacitors, can be exemplified.

As the semiconductor layer forming liquid 59, the liquid 59 is not specifically limited as long as it is a solution capable of forming a semiconductor layer by energization, and can be a solution containing, for example, aniline, thiophene, pyrrole, methylpyrrole, or substituted derivative thereof (e.g., 3,4-ethylenedioxythiophene). Dopant can be added to the semiconductor layer forming liquid 59. Although such dopant is not specifically limited, it can be, for example, publicly known dopant, such as, e.g., arylsulfonate or its salt, alkylsulfonate or its salt, or polymer sulfonate or its salt. By performing the energization using such semiconductor layer forming liquid 59, a semiconductor layer 55 of, e.g., conducting polymer (for example, polyaniline, polythiophene, polypyrrole, or polymethylpyrrole) can be formed on the surface of the dielectric layer 54 on the surface of the conductive member 52.

In the present invention, an electrode layer can be formed on the semiconductor layer 55 of the capacitor element 56 obtained by the aforementioned production method to improve the electrical connection to an electrode terminal (example, a lead frame) as an external terminal of the capacitor.

The electrode layer can be formed by, for example, solidification of conductive paste, or formation of a plated layer, an electric evaporated film, or a conductive resin film. As the conductive paste, it is preferable to use silver paste, copper paste, aluminum paste, carbon paste, or nickel paste. One of the aforementioned pastes or two or more of the aforementioned pastes can be used. In the case of using two or more pastes, these pastes can be mixed, or can be formed into separate layers arranged one on the other.

A capacitor can be obtained by electrically connecting electrode terminals to the conductive member 52 and the semiconductor layer 55 of the capacitor element 56 obtained as mentioned above, respectively, (for example, a lead wire 53 is welded to one of the electrode terminals, and an electrode layer (semiconductor layer) 55 is connected to the other electrode terminal with silver paste), and sealing the capacitor element except for a part of the electric connection terminals.

Although the sealing method is not specifically limited, it can be, for example, a resin mold outer covering, a resin case outer covering, a metallic case outer covering, a resin wrapping outer covering, or a laminate film outer covering. Among them, a resin mold outer covering is preferable since the size reduction and the cost reduction can be easily performed.

EXAMPLES

Next, concrete examples of the present invention will be explained. It should be, however, noted that the present invention is not limited to these examples.

Example 1

Production of Anode Member (Conductive Member) 52

Niobium powder having an average particle diameter of 127 μm was obtained by granulating niobium primary powder (average grain diameter of 0.20 μm) obtained by pulverizing a niobium (Nb) ingot using the hydrogen brittleness (this niobium powder is minute powder and therefore naturally oxidized, and contains 11 mass % of oxygen). Next, the obtained niobium powder was left in a nitrogen atmosphere of 450° C., and then left in an argon atmosphere of 700° C., to thereby obtain partially nitrided niobium powder (CV value: 280,000 μF·V/g) of 8,000 ppm in nitride amount. The partially nitrided niobium powder was molded together with a niobium wire (lead wire) having a diameter of 0.29 mm, and then sintered at 1,270° C. to obtain a sintered body (anode member) 52 of a rectangular parallelepiped shape having a length of 2.3 mm, a width of 1.7 mm, and a thickness of 1.0 mm. The niobium lead wire 53 was integrally buried in the sintered body 52 such that the lead wire 53 was inwardly extended from the surface of 1.7 mm×1 mm to a position positioned inwardly from the surface by 1.3 mm and outwardly extended from the center of the surface by 10 mm.

[Production of the Parallel Connected Socket 8 of the Present Invention]

One parallel connected socket (made by Preci-dip corporation, product name: "PCD receptacle 311 series round pin DIP socket," 2.54 mm pitch, 64 pin connected socket, the lead wire 4 was not bent, but extended straight) was prepared. Silicone resin ("TSE392-C" made by GE Toshiba Silicone Corporation) was filled in each lead wire insertion port 37 formed on the bottom surface of the parallel connected socket in a dented manner to form a resin filled coating portion 3A. Further, the entire outer surface of the socket body portion 2 was coated with the same silicone resin to form an outer peripheral resin coating portion 3B (the metal exposed portion except for the lead wire 4 was coated with the silicone resin). Thus, a parallel connected socket 8 of the present invention was obtained (see FIG. 3).

[Production of a Solid Electrolytic Capacitor Element Producing Jig of the Present Invention]

Initially, a copper-clad glass epoxy board (circuit board) 11 having a length of 194.0 mm, a width of 33.0 mm, and a thickness of 1.6 mm was prepared (see FIG. 1). This copper-clad glass epoxy board 11 was provided with cut-out portions 12 and 12 at each one end side (lower side in the figure) in the widthwise direction (the up-and-down direction in the figure) of both end portions of the board in the length direction (right and left direction in the figure), and electric connection terminals 14 and 15 having a size of 23 mm×8 mm were provided at the regions above the right and left cut-out portions 12 and 12. At the region above one of the cut-out portion 12, a current limiting terminal 14 was provided, while at the region above the other cut-out portion 12, a voltage limiting terminal 15 was provided (see FIG. 1).

The copper-clad glass epoxy board 11 was provided with the circuit shown in FIG. 7 including 64 pieces of 20 kΩ resistances (error: 1%), 64 pieces of transistors (2SA2154GR) 19, and one parallel connected socket 88 (made by Preci-dip corporation, product name: "PCD receptacle 399 series round pin DIP socket," 2.54 mm pitch, 64 pin connected socket) formed only on one surface (front surface) of the board 11 (see FIGS. 1 and 2).

As shown in FIG. 2, the lead wire 84 of each socket 81 was extended upward from the upper surface of the socket body portion 82 and then bent toward the board 11 at an angle of about 90 degrees in a curved manner and inserted into each of 64 holes formed in the lower portion of the board 11 and secured to the circuit board 11 with solder.

Each lead wire 4 of the parallel connected socket 8 of the present invention (in which the lead wire insertion port 37 formed on the bottom surface of the parallel connected socket was filled with silicone resin to form a resin filled coating portion 3A, and the entire outer surface of the socket body portion was also coated with silicone resin to form an outer peripheral resin coating portion 3B) was inserted into and connected to the lead wire insertion port formed on the bottom surface of the parallel connected socket 88 in a dented manner, and a parallel connected socket 8 of the present invention was connected to the lower portion of the parallel connected socket 88 to thereby form a two-stage structure. Thus, a solid electrolytic capacitor element producing jig 10 in which the parallel connected socket 8 was attached to the copper-clad glass epoxy board (circuit board) 11 was obtained (see FIGS. 1 and 2). The second stage parallel connected socket 8 was used as a connection terminal for an anode member 52.

[Production of a Capacitor Element]

Figure 6:
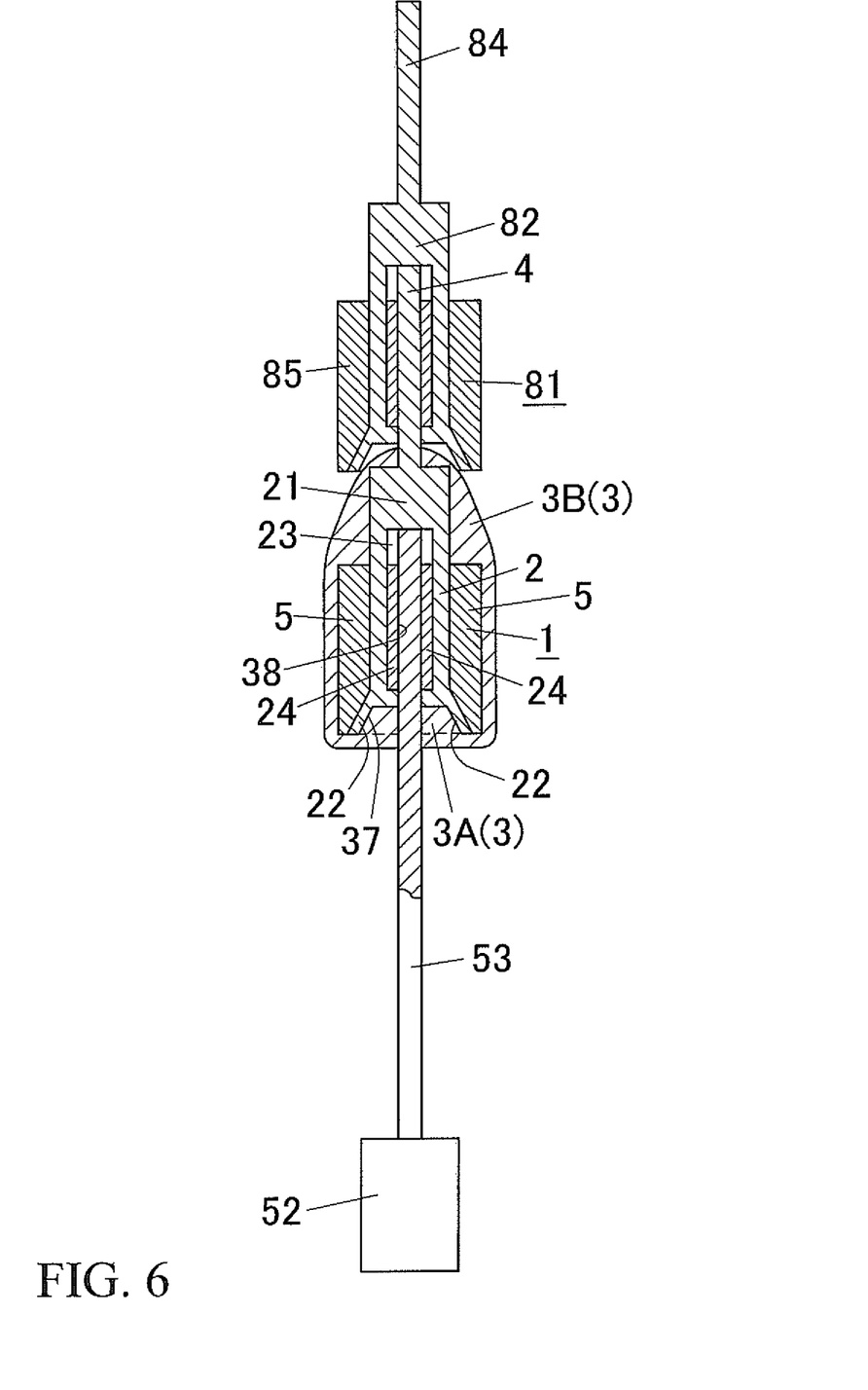
FIG. 6 is a cross-sectional view showing a connection state of the socket and the anode member shown in FIG. 5.

A niobium lead wire 53 of the anode member (conductive sintered body) 52 was inserted into each lead wire insertion port 38 of the parallel connected socket 8 of the solid electrolytic capacitor element producing jig 10 to be electrically connected thereto (see FIGS. 5 and 6). In detail, the lead wire 53 of the anode member 52 was run through the resin filled coating portion 3A of the socket 1 and inserted into the lead wire insertion port 38 to thereby be electrically connected to the socket 1. Four capacitor element producing jigs 10 each having the anode members 52 connected thereto were prepared, and attached to a parallel arranging holding frame such that the connected anode members 52 were suspended downward were prepared. This frame was arranged at a position above a metallic (stainless-steel) processing container 50 containing 2 mass % phosphoric acid aqueous solution (processing liquid) 59 (see FIG. 5). The four capacitor element producing jigs 10 were arranged in parallel on the holding frame at intervals of 8 mm. The metallic processing container 50 also functioned as a cathode (negative) plate 51.

Operating the holding frame, the jigs 10 were lowered so that the entire anode members 52 and a 5 mm length of the lower portion of the lead wire 53 were immersed in the processing liquid 59, and fixed at the height. In this immersed state, a voltage was applied between the voltage limiting terminal 15 and the cathode (negative) plate 51 (including the metallic processing container 50) so that the voltage limiting value (formation voltage) became 10 V, while a voltage was applied between the current limiting terminal 14 and the voltage limiting terminal 15 so that the current limiting value became 2 mA. In a state in which the temperature of the processing liquid 59 was maintained at 65° C., anodization was performed for 6 hours. Thus, a dielectric layer 54 was formed on the minute pores and the outer surface of the conductive sintered body 52 and the surface of a part (5 mm length) of the lead wire.

Comparative Example 1

A dielectric layer was formed by performing chemical conversion treatment in the same manner as in Example 1 except that a coating portion 3 (a resin coating portion 3A and an outer peripheral resin coating portion 3B) was not formed on the second stage socket (i.e., a dielectric layer forming step was executed).

Example 2

A dielectric layer 54 was formed by performing chemical conversion treatment in the same manner as in Example 1 except that the following anode member X was used as an anode member 52 (i.e., a dielectric layer forming step was executed). In detail, partially nitrided niobium powder obtained in Example 1 was molded together with a niobium wire (lead wire) of 0.15 mm φ (i.e., a diameter of 0.15 mm) and then sintered at 1,270° C. to obtain an anode member X (sintered body) 52 of a rectangular parallelepiped shape having a length of 1.1 mm, a width of 0.53 mm, and a thickness of 0.43 mm, and the obtained anode member X was used. In this anode member X, the niobium lead wire 53 was buried in the sintered body such that the lead wire 53 was inwardly extended from the surface of 0.53 mm×0.43 mm to a position positioned inwardly from the surface by 0.74 mm and outwardly extended from the center of the surface by 10 mm.

Comparative Example 2

Although a dielectric layer was to be formed in the same manner as in Example 2 except that a coating portion 3 (a resin coating portion 3A and an outer peripheral resin coating portion 3B) was not formed, since no coating portion 3 was formed, the conductive bodies 52 could not be secured to the second stage socket (i.e., the conductive bodies 52 were dropped from the second stage socket). Accordingly, in this Comparative Example 2, no further chemical conversion treatment could be performed.

After the chemical conversion treatment, the anode members 52 were detached and the second stage socket 1 was detached, and the presence or absence and degree of corrosion of the lead wire insertion port 37 at the bottom surface of the socket 1 were visually observed. After the observation, the second stage socket 1 was again inserted into the first stage socket 81 and then new anode members 52 were inserted into the second stage socket 1. In this state, chemical conversion treatment was performed in the same manner as mentioned above. After completion of the second chemical conversion treatment, in the same manner as mentioned above, the anode members 52 were removed and the second stage socket 1 was removed, and the presence or absence and degree of corrosion of the lead wire insertion port 37 at the bottom surface of the socket 1 were visually observed. By repeating such chemical conversion treatment and corrosion observation, it was checked how much degree of corrosion was progressed depending on the number of chemical conversion treatments executed with respect to Example 1 and Comparative Example 1.

As a result, in Comparative Example 1, it was confirmed that the $8^{th}$ chemical conversion treatment caused corrosion of a few sockets among sixty four connected sockets and the $22^{nd}$ chemical conversion treatment caused corrosion of about half of sockets among sixty four connected sockets. After the $14^{th}$ chemical conversion treatment, it was observed that copper color powder-like material was thinly accumulated on the inner bottom surface of the processing container 50 (at the bottom portion of the chemical conversion treatment liquid).

On the other hand, in Example 1, even after the $57^{th}$ chemical conversion treatment, corrosion was not observed at all in all sockets 1 including the lead wire insertion ports 37. Even after the $115^{th}$ chemical conversion treatment, no powder-like material was observed on the inner bottom surface of the processing container 50 (at the bottom portion of the chemical conversion treatment liquid).

Further, in Example 2, even after the $74^{th}$ chemical conversion treatment, it was confirmed that corrosion was not observed at all in all sockets 1 including the lead wire insertion ports 37.

Next, on the surface of a dielectric layer 54 of a conductive member 52 formed at the $22^{nd}$ chemical conversion treatment in Example 1, a semiconductor layer 55 of conductive polymer (ethylenedioxythiophene polymer in which anthraquinone sulphonic acid was doped), carbon paste, and silver paste were laminated and hardened in this order, and attaching a lead frame, sealing, aging, cutting and bending the lead frame, and electrical measurement were performed in sequence to obtain a chip-shaped solid electrolytic capacitor of 3.5 mm×2.8 mm×1.8 mm, rated voltage 2.5 V, capacity 330 μF. Further, with the conductive member 52 having a dielectic layer 54 on the surface thereof at the $22^{nd}$ chemical convention treatment in Comparative Example 1, in the same manner as mentioned above, a chip-shaped solid electrolytic capacitor of rated voltage 2.5 V, capacity 330 μF was obtained.

<Moisture Resistance Test of Solid Electrolytic Capacitor>

Twenty pieces of the aforementioned Example 1 series solid electrolytic capacitors and the twenty pieces of the aforementioned Comparative Example 1 series solid electrolytic capacitors were mounted on a substrate in a reflow furnace having a temperature pattern of 5 seconds at the peak temperature of 260° C. and 30 seconds at 230° C. or above. Then, the assembly was put in a constant temperature and humidity container of 60° C. and 90% RH, and left for 2,000 hours in non-voltage applied state. Thereafter, the assembly was returned to a room temperature and subjected to an LC (leak current) measurement after 30 seconds in a 2.5 V applied state in a room temperature.

As a result, in the Example 1 series assemblies, the LC (leak current) value was 0.1 CVμA or less in all of twenty capacitors. On the other hand, in the Comparative Example 1 series assemblies, it was found that the LC (leak current) value exceeded 0.1 CVμA in nine capacitors, poor in LC value.

This application claims priority to Japanese Patent Application No. 2009-284033 filed on Dec. 15, 2009, and the entire disclosure of which is incorporated herein by reference in its entirety.

INDUSTRIAL APPLICABILITY

Although the socket according to the present invention can be preferably used as a member for a capacitor element producing jig, the socket is not specifically limited to such usage. Furthermore, the capacitor element producing jig according to the present invention can be preferably used as an electrolytic capacitor element producing jig, but not limited thereto. Furthermore, a capacitor obtained by the production method of the present invention can be utilized in electric devices, such as, e.g., a personal computer, a server, a camera, a game machine, a DVD, an AV devices, or a digital device such as a cellular phone.

DESCRIPTION OF THE REFERENCE NUMERALS 1 socket
2 socket body portion
3A coating portion
3B outer peripheral resin coating portion
4 lead wire portion
5 insulation portion
8 parallel connected socket
10 capacitor element producing jig
11 circuit board
14 current limiting terminal (electric connector)
15 voltage limiting terminal (electric connector)
18 resistor
19 transistor
30 electric circuit
31 diode
37 lead wire insertion port
51 cathode (negative) plate
52 positive plate (conductive member)
54 dielectric layer
55 semiconductor layer
56 capacitor element
59 processing liquid (chemical conversion treatment liquid, semiconductor layer forming liquid)

The invention claimed is:

1. A production method of a capacitor element including a dielectric layer forming step comprising:
   connecting a conductive member to a socket for a capacitor element producing jig, the capacitor element producing jig including:
   a circuit board; and
   the socket attached to the circuit board, the socket including:
   a conductive socket body portion having an insertion port;
   a resin insulation portion covering a part of the socket body portion so as not to close the insertion port; and
   a resin coating portion coating at least the insertion port of the socket body portion, wherein
   the resin constituting the coating portion is a resin having rubber elasticity, and
   the socket body portion is electrically connected to an electric circuit configured to supply an electric current, immersing the conductive member in a chemical conversion treatment liquid; and
   in the immersed state, passing a current between the conductive member as an anode electrode and an electrode arranged in the chemical conversion treatment liquid as a cathode electrode to thereby form a dielectric layer on a surface of the conductive member.

2. The production method as recited in claim 1, wherein the coating portion coats an entire outer surface of the socket body portion.

3. The production method as recited in claim 1, wherein the resin constituting the coating portion is at least one resin selected from the group consisting of natural rubber, synthetic rubber, silicone resin, thermoplastic elastomer, and urea resin.

4. The production method as recited in claim 1, wherein the resin constituting the coating portion is silicone resin.

5. The production method as recited in claim 1, wherein the resin constituting the coating portion is transparent.

6. The production method as recited in claim 1, further comprising a conductive lead wire portion electrically connected to the socket body portion.

7. The production method as recited in claim 1, wherein the electric circuit is a constant current circuit.

8. The production method as recited in claim 1, wherein the electric circuit is also a voltage limiting circuit.

9. The production method as recited in claim 1, wherein the socket is attached to an end portion of the circuit board.

10. The production method as recited in claim 1, further comprising:
    a semiconductor layer forming step including:
    immersing the conductive member having the dielectric layer on the surface thereof obtained by the dielectric layer forming step in semiconductor layer forming liquid; and
    in the immersed state, passing a current between the conductive member as an anode electrode and an electrode arranged in the semiconductor layer forming liquid as a cathode electrode to thereby form a semiconductor layer on a surface of the dielectric layer.

11. The production method as recited in claim 10, comprising the steps of:
    electrically connecting electric connection terminals to the conductive member and the semiconductor layer of the capacitor element; and
    sealing the capacitor element except for a part of the electric connection terminals.

* * * * *